UNITED STATES PATENT OFFICE.

WILLIAM PRAMPOLINI, OF SAN LUIS POTOSI, MEXICO.

COMPOSITION OF MATTER AND PREPARATION OF SAME.

SPECIFICATION forming part of Letters Patent No. 702,678, dated June 17, 1902.

Application filed February 6, 1902. Serial No. 92,908. (No specimens.)

*To all whom it may concern:*

Be it known that I, WILLIAM PRAMPOLINI, a subject of the King of Italy, residing at San Luis Potosi, Mexico, have discovered a certain new and useful Composition of Matter and Preparation of the Same, of which the following is a specification.

In Letters Patent of the United States granted to me on March 13, 1900, No. 654,331, I have described and claimed a new substitute for india-rubber, consisting of the gummy matter of the shrub called and to which I have added the botanical name "*Synanthereæas Mexicanas*" and known also by the Indian names of "Yule," "Copalin," "Yerba del Negro," "Guayule," "Jiguhite," and "Hule," and its method of extraction from the shrub containing the gum.

The shrub is known in Mexico by the various names above given in different localities, and at very short distances apart the shrub may be called "Copalin," "Guayule," "Jiguhite," &c., according to the dialect of the Indians of the special locality. It is best and most widely known officially and commonly by the people of Mexico by the name "Guayule." It does not appear to have been described in the botanical works of the United States or Mexico; but it can be easily identified under the designation "Guayule." It is not one of the *Euphorbiaceæ* and does not exude its gum from the bark, as in the case of rubber trees belonging to the family of *Euphorbiaceæ* and in the manner of the *Castilloa*, but contains the gum both in the bark and in the woody fiber in the stems of the shrub, from which it is extracted by appropriate methods. My present invention relates to the vulcanization of this gum, (which I have designated as "Twentieth Century Gum.") I have discovered that the gum of this shrub after it has been extracted can be vulcanized in the same manner as caoutchouc produced from the ordinary india-rubber tree, known as one of the trees designated botanically as the "*Euphorbiaceæ*," although the gum of the "Guayule" or "Hule" shrub differs in many respects from caoutchouc.

In order to vulcanize my new gum, I mix it with from one to ten per cent. of sulfur, according to the different uses for which the vulcanized product is designed, the greater amount of sulfur being employed for the harder compounds, as in the case of vulcanized caoutchouc, and the lesser amounts being employed for the softer compounds. The sulfur is mixed with the gum, preferably by means of heated rolls at a temperature of from 6° to 8° centigrade, the sulfur being added to the gum very slowly until the mass becomes homogeneous. If it is desired to add coloring-matter or adulterants to the composition, they should be added in a finely-divided state at this stage of the process and mixed with the gum and sulfur upon the heated rolls in the same manner as they are used with caoutchouc. After the rolling process has been continued until the ingredients have become thoroughly mixed the composition is placed in molds or frames designed to give it the desired shape and placed between metal plates and put into iron or bronze cases capable of standing a steam-pressure of four to eight atmospheres under a heat of from 130° to 280° Fahrenheit, the degree of heat being determined by the use to which the composition is intended to be put and according to the amount of sulfur used in the same manner as is employed in vulcanizing india-rubber, and the composition is subjected to this heat from one to eight hours, according to the thickness of the sheet or mass of material in the mold or frame in the same manner as is employed in vulcanizing Para rubber. The resulting composition will be elastic and waterproof, and, although differing somewhat, as stated, from vulcanized Para rubber, it can be used as a substitute in very many applications in the arts, while it possesses the advantages of being cheaper than Para rubber and produced from a much more prolific source of supply.

I have found that my gum can be vulcanized by the use not only of pure sulfur, but by the use of the sulfur compounds employed in vulcanizing the Para rubber, and in using such compounds the method practiced conforms to that used in vulcanizing Para rubber in the different forms in which it is vulcanized for the different uses to which it is intended to utilize the product. I have found also that the different adulterants and coloring-matters used with Para rubber can also be used with my gum.

As a specific example of the proportions I may state that I have found that a useful sheet of vulcanized "Twentieth Century Gum" of one-half inch in thickness can be made by mixing on the rolls, as described, one hundred parts of gum to one and one-quarter parts of sulfur. This composition can be vulcanized by subjecting it to a steam-pressure of from four to eight atmospheres for one and three-quarter hours at a heat of 260° to 270° Fahrenheit. I do not, however, as stated above, confine myself to these proportions of ingredients, nor these specific ingredients, nor these specific degrees of heat, nor the specific length of time that the composition is exposed to heat, as I have found that the same methods can be applied to vulcanizing this new gum as are used with the caoutchouc known as "Para rubber," and the same adulterants can be used therewith.

Having thus described my invention, what I claim is—

1. The new composition of matter resulting from heating a mixture of the gummy matter of the shrub called "*Synanthereoeas Mexicanas*," and known also by the Indian names of "Yule," "Copalin," "Yerba del Negro," "Guayule," "Jiguhite," and "Hule," and sulfur or sulfur compounds, substantially as described.

2. The new composition of matter resulting from heating under pressure a mixture of the gummy matter of the shrub called "*Synanthereoeas Mexicanas*," and known also by the Indian names of "Yule," "Copalin," "Yerba del Negro," "Guayule," "Jiguhite," and "Hule," and sulfur or sulfur compounds, substantially as described.

3. The new composition of matter resulting from heating under pressure a mixture of the gummy matter of the shrub called "*Synanthereoeas Mexicanas*," and known also by the Indian names of "Yule," "Copalin," "Yerba del Negro," "Guayule," "Jiguhite," and "Hule," and sulfur or sulfur compounds, and adulterating matter, substantially as described.

4. The new composition of matter resulting from heating under pressure a mixture of the gummy matter of the shrub called "*Synanthereoeas Mexicanas*," and known also by the Indian names of "Yule," "Copalin," "Yerba del Negro," "Guayule," "Jiguhite," and "Hule," sulfur or sulfur compounds, adulterating matter, and coloring-matter, substantially as described.

5. The method of vulcanizing the gummy matter of the shrub called "*Synanthereoeas Mexicanas*," and known also by the Indian names of "Yule," "Copalin," "Yerba del Negro," "Guayule," "Jiguhite," and "Hule," which consists in mixing said gum with sulfur or its compounds and subjecting the said mixture to heat and pressure, substantially as described.

6. The method of vulcanizing the gummy matter of the shrub called "*Synanthereoeas Mexicanas*," and known also by the Indian names of "Yule," "Copalin," "Yerba del Negro," "Guayule," "Jiguhite," and "Hule," which consists in mixing said gum with sulfur or its compounds, and adulterating matter, and subjecting the said mixture to heat and pressure, substantially as described.

7. The method of vulcanizing the gummy matter of the shrub called "*Synanthereoeas Mexicanas*," and known also by the Indian names of "Yule," "Copalin," "Yerba del Negro," "Guayule," "Jiguhite," and "Hule," which consists in mixing said gum with sulfur or its compounds, adulterating matter, and coloring-matter, and subjecting the said mixture to heat and pressure, substantially as described.

WILLIAM PRAMPOLINI.

Witnesses:
 THEODORE FITCH,
 JAMES M. STEWART.